(12) United States Patent
Kajekar et al.

(10) Patent No.: US 8,824,482 B2
(45) Date of Patent: Sep. 2, 2014

(54) METHOD AND SYSTEM FOR REMOVING DEAD ACCESS CONTROL ENTRIES (ACES)

(75) Inventors: Preetham Kajekar, Karnataka (IN); Krishna Sathyanarayana, Karnataka (IN); Sundar Ramakrishnan, Karnataka (IN); Ganesh Krishnamurthy Bangalore, Karnataka (IN); Varakuti Venugopal Reddy, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 13/242,834

(22) Filed: Sep. 23, 2011

(65) Prior Publication Data
US 2012/0008508 A1     Jan. 12, 2012

Related U.S. Application Data

(63) Continuation of application No. 11/387,121, filed on Mar. 22, 2006, now Pat. No. 8,040,895.

(51) Int. Cl.
*H04L 12/28* (2006.01)
(52) U.S. Cl.
USPC .................................................... 370/395.31
(58) Field of Classification Search
CPC ......... H04L 45/00; H04L 45/02; H04L 45/28; H04L 45/72; H04L 49/25; H04L 43/50; H04L 45/50; H04L 45/68; H04L 45/74; H04L 45/24; H04W 80/04; H04W 40/00; H04W 40/04; H04J 3/247; H04Q 11/0067
See application file for complete search history.

(56) References Cited

U.S. PATENT DOCUMENTS

| | | | |
|---|---|---|---|
| 7,349,382 B2 * | 3/2008 | Marimuthu et al. | 370/351 |
| 7,424,014 B2 | 9/2008 | Mattes et al. | |
| 2001/0028651 A1 * | 10/2001 | Murase | 370/392 |
| 2002/0124078 A1 * | 9/2002 | Conrad | 709/224 |
| 2002/0169884 A1 | 11/2002 | Jean et al. | |
| 2006/0077964 A1 | 4/2006 | Wu et al. | |
| 2006/0182036 A1 * | 8/2006 | Sasagawa et al. | 370/242 |
| 2006/0230442 A1 | 10/2006 | Yang | |
| 2008/0197992 A1 | 8/2008 | Murray et al. | |

OTHER PUBLICATIONS

Controlling ACL file size, Chapter 6—Operational notes, Advanced Server/9000 Version, B.04.04/B.03.04 Release Notes, 1999, Hewlett Packard, USA, 38 pages.

* cited by examiner

*Primary Examiner* — Phuc Tran
*Assistant Examiner* — Raul Rivas
(74) *Attorney, Agent, or Firm* — Edwards Wildman Palmer LLP; James M. Behmke; Stephen D. LeBarron

(57) ABSTRACT

Methods and systems have been provided for removing dead Access Control Entries (ACEs) in an Access Control List (ACL). In one embodiment, the dead ACEs can be detected for an egress as well as an ingress ACL. The ACEs that have a hit count above a user-specified hit count are checked for their validity. The validity of the ACE is checked, using the information based on a Forwarding Information Base (FIB). If an ACE is found to be invalid, it is considered dead. The dead ACEs are referred as candidates for removal from the ACL. If the ACE is found to be a candidate for removal, a system administrator can either warn the network administrator about the candidate for removal or delete the ACE from the ACL after a pre-defined time limit.

21 Claims, 6 Drawing Sheets

METHOD AND SYSTEM FOR REMOVING DEAD ACCESS CONTROL ENTRIES (ACES)

CROSS-REFERENCE TO RELATED APPLICATIONS

This application is a continuation application of and claims priority to U.S. application Ser. No. 11/387,121, filed on Mar. 22, 2006, the entire contents of which are incorporated herein by reference.

BACKGROUND OF THE INVENTION

1. Field of Invention

Embodiments of the present invention relate, in general, to digital networks. More specifically, embodiments of the present invention relate to methods and systems for identifying dead Access Control Entries (ACEs) in an ACL.

2. Description of the Background Art

In a network, a router receives data packets from a source and forwards these data packets to a destination. However, the data packets have to meet certain criteria in order to be forwarded by the router. The specified criteria in an Access Control List (ACL) are included in the router. The ACL includes Access Control Entries (ACEs). These ACEs are statements specifying denials and permissions for forwarding data packets through the router. For example, the ACE can deny the forwarding of a data packet from a certain source through the router. Further, the ACE can deny the forwarding of a data packet through the router to a certain destination. In some cases, the ACE can permit or deny the forwarding of the data packet through the router, irrespective of the source and the destination of the data packet.

The number of ACEs in the ACL varies. For example, data packets with the same source and destination may require only one ACE to specify the denial or the permission. Therefore, the number of ACEs in the ACL may increase with the increase in the traffic through the router or with modifications in the network, such as addition of a network device. However, with time, some ACEs may no longer be valid. For example, an ACE may include a statement of permission or denial to a network that does not exist any more. Such invalid ACEs are considered as dead and unnecessarily occupy space in the ACL. Eliminating dead ACEs can save processing time and increase the speed of a network device because a network device uses high frequency while checking an ACL.

DETAILED DESCRIPTION OF EMBODIMENTS OF THE INVENTION

Embodiments of the present invention provide methods, systems, and computer-readable media for removing dead Access control Entries (ACEs) in an Access Control List (ACL). In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the present invention provide a method and system for removing dead Access Control Entries (ACEs) from an Access Control List (ACL). The number of ACEs in the ACL may increase with the increase in the traffic through the router or with modifications in the network, such as addition of a network device. However, with time, some ACEs may no longer be valid. For example, an ACE may include a statement of permission or denial to a network that does not exist any more. Such invalid ACEs are considered as dead and are referred as candidates for removal from the ACL. These ACEs unnecessarily occupy space in the ACL. Eliminating dead ACEs can save processing time and increase the speed of a network device because a network device uses computing time while checking an ACL. Eliminating dead ACEs also improves manageability of the ACL, and hence of the network. Therefore dead ACEs need to be deleted regularly from the ACL.

Figure 1:
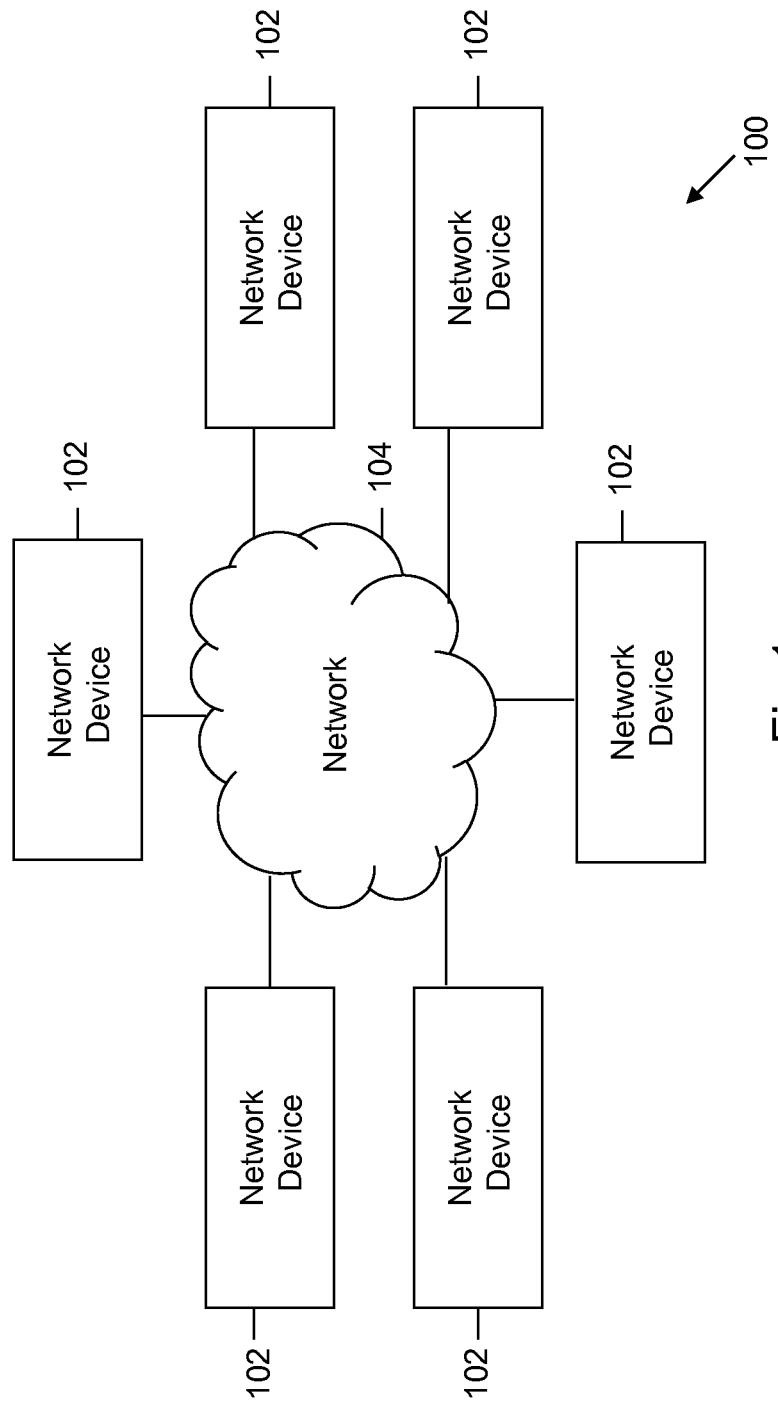
FIG. 1 illustrates an environment wherein embodiments of the present invention can be performed.

Referring now to drawings, more particularly by their reference numbers, FIG. 1 illustrates environment 100, wherein embodiments of the present invention can be performed. Environment 100 includes network devices 102 that are connected to each other through network 104. Examples of network devices 102 include, but are not limited to, gateways, routers, firewalls, repeaters, bridges and switches. Network devices 102 receive and transmit data packets via network 104. A network device from network devices 102 receives data packets from a source and forwards them to a destination. The source and the destination are also network devices 102.

The data packets have to satisfy certain rules in order to be forwarded through the network device. For example, a network device, such as a router, filters incoming packets on the basis of access control rules and drops the packets that do not satisfy the access control rules. These access control rules are based on various security measures; congestion factors or malfunctioned networking devices 102.

Figure 2:
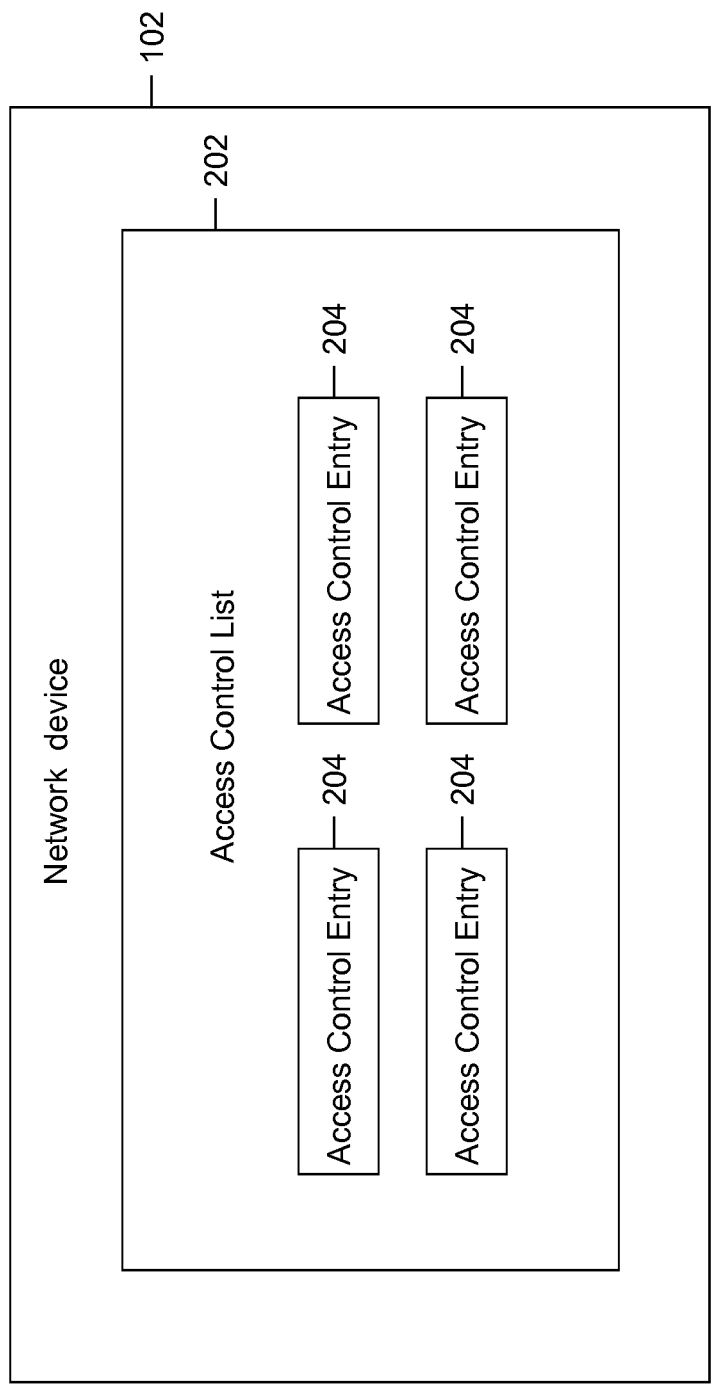
FIG. 2 illustrates a network device, in accordance with embodiments of the present invention.

FIG. 2 illustrates the network device, in accordance with embodiments of the present invention. In the network device, the access control rules are defined by Access Control List (ACL) 202. ACL 202 includes Access Control Entries (ACEs) 204. ACEs 204 are statements that include denials or permissions for forwarding the data packets through the network device. For example, an ACE from ACEs 204 can deny the forwarding of a data packet from a certain source through the network device. Further, the ACE can deny the forwarding of a data packet through the network device to a certain destination. In some cases, ACE 204 can permit or deny the forwarding of the data packet through the network device, irrespective of the source and the destination of the data packet.

However, with the passage of time, if the paths to some source and destination networks cease to exist, then ACEs 204 that include permissions or denials to forward packets of data to such sources and destinations become invalid. The invalid ACEs 204 are termed as dead ACEs. The dead ACEs unnecessarily increase the size of ACL 202. Therefore, to optimize the size of ACL 202, the dead ACEs need to be deleted from ACL 202. ACEs 204 can be checked for their validity and if they are considered dead they can be indicated as candidates for removal. ACEs 204 that have a hit count below a user-specified hit count are checked for their validity. The hit count is the number of times the ACE gives permission to data packets to pass through the network device. Further, the ACEs whose hit count has not changed over a predefined period of time can also be checked for their validity. The predefined period of time can be defined by a user. Embodiments of the present invention provide methods and systems to detect a candidate for removal by checking the validity of the ACE. In an embodiment of the present invention, the validity of only those ACEs 204 is checked, which include statements of permissions of forwarding the packets of data through the network device.

Figure 3A:
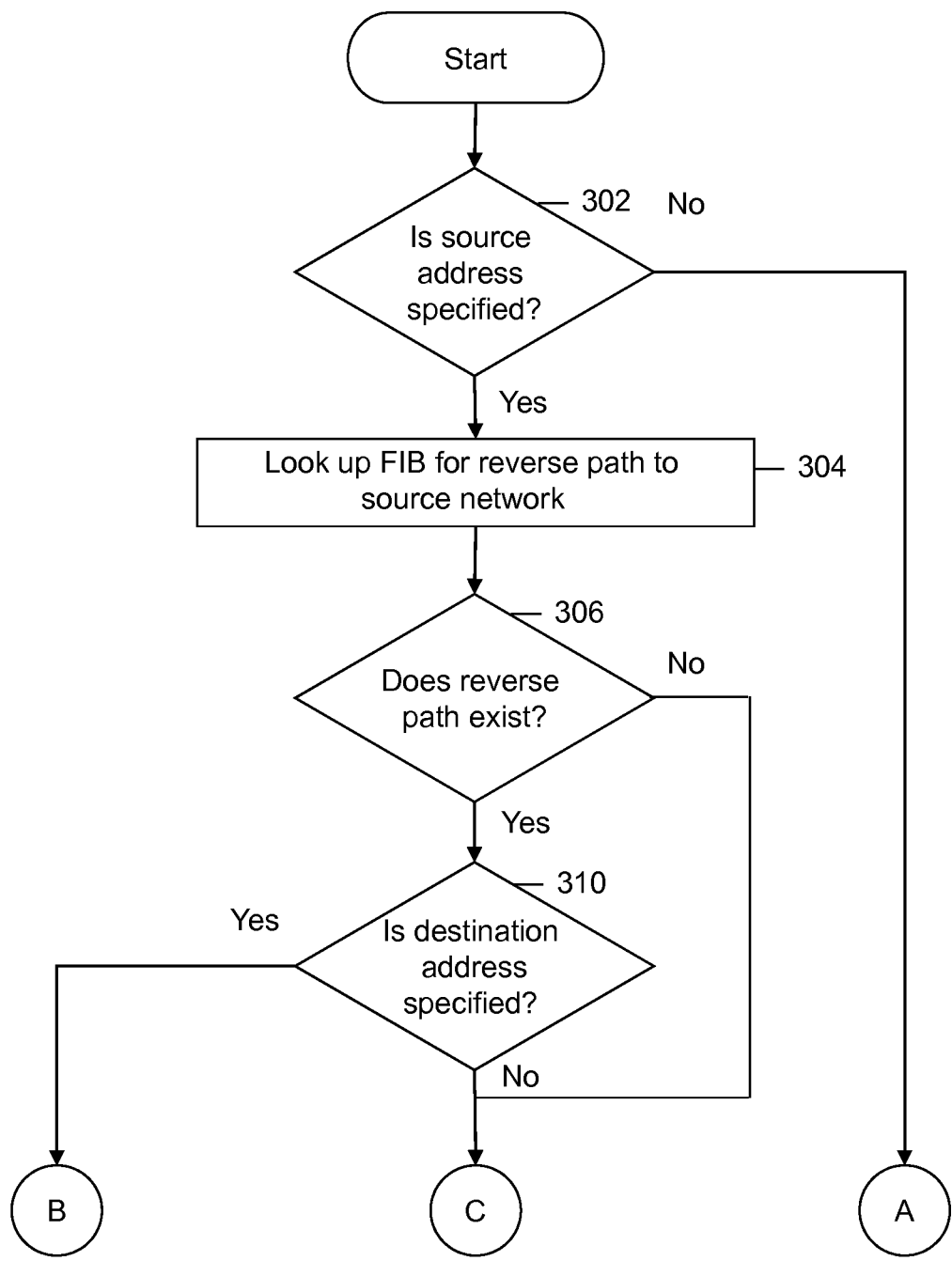
FIGS. 3a and b is a flowchart, illustrating a method to check the validity of an Access Control Entry (ACE) of an ingress ACL, in accordance with an embodiment of the present invention.
Figure 3B:
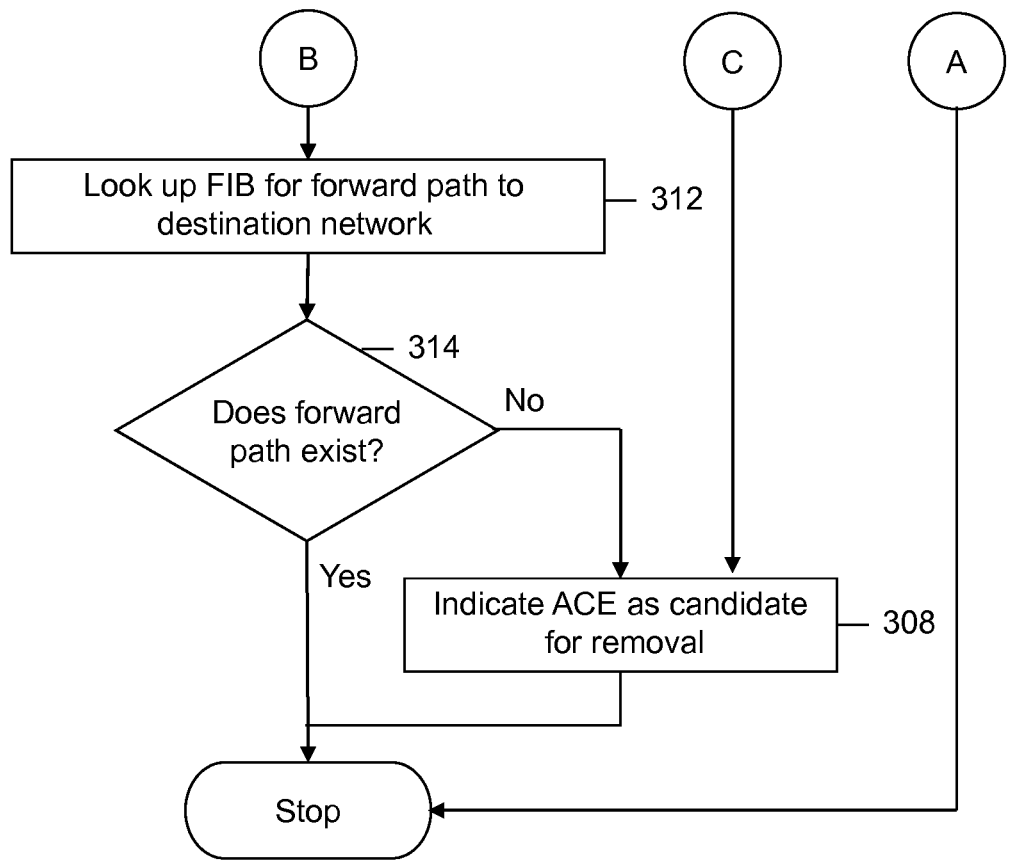

FIGS. 3a and b is a flowchart, illustrating a method to check the validity of an ACE from ACEs 204 of an ingress ACL, in accordance with an embodiment of the present invention. In an embodiment of the present invention, the checks for the validity of ACEs 204 are performed only on network devices 102 that deploy Unicast Reverse Path Forwarding (μRPF) on them. At step 302, it is checked if a source address is specified in the ACE. If the source address is specified in the ACE, then at step 304, a Forwarding Information Base (FIB) is looked up to find a reverse path to a network, corresponding to the source address, hereinafter referred as a source network. At step 306, it is checked if the reverse path to the source network exists. If the reverse path to the source network does not exist, then, at step 308, the ACE is considered dead and can be indicated as the candidate for removal. If the reverse path to the source network exists, then, at step 310, it is checked if a destination address is specified in the ACE. If a destination address is not specified in the ACE, the ACE is considered dead and can be indicated as the candidate for removal, according to step 308. If the destination address is specified in the ACE then, at step 312, the FIB is looked up to find a forward path to a network corresponding to the destination address, hereinafter referred as a destination network. At step 314, it is checked if the forward path to the destination network exists. If the forward path to the destination network does not exist, then according to step 308, the ACE is considered dead and can be indicated as the candidate for removal.

Figure 4A:
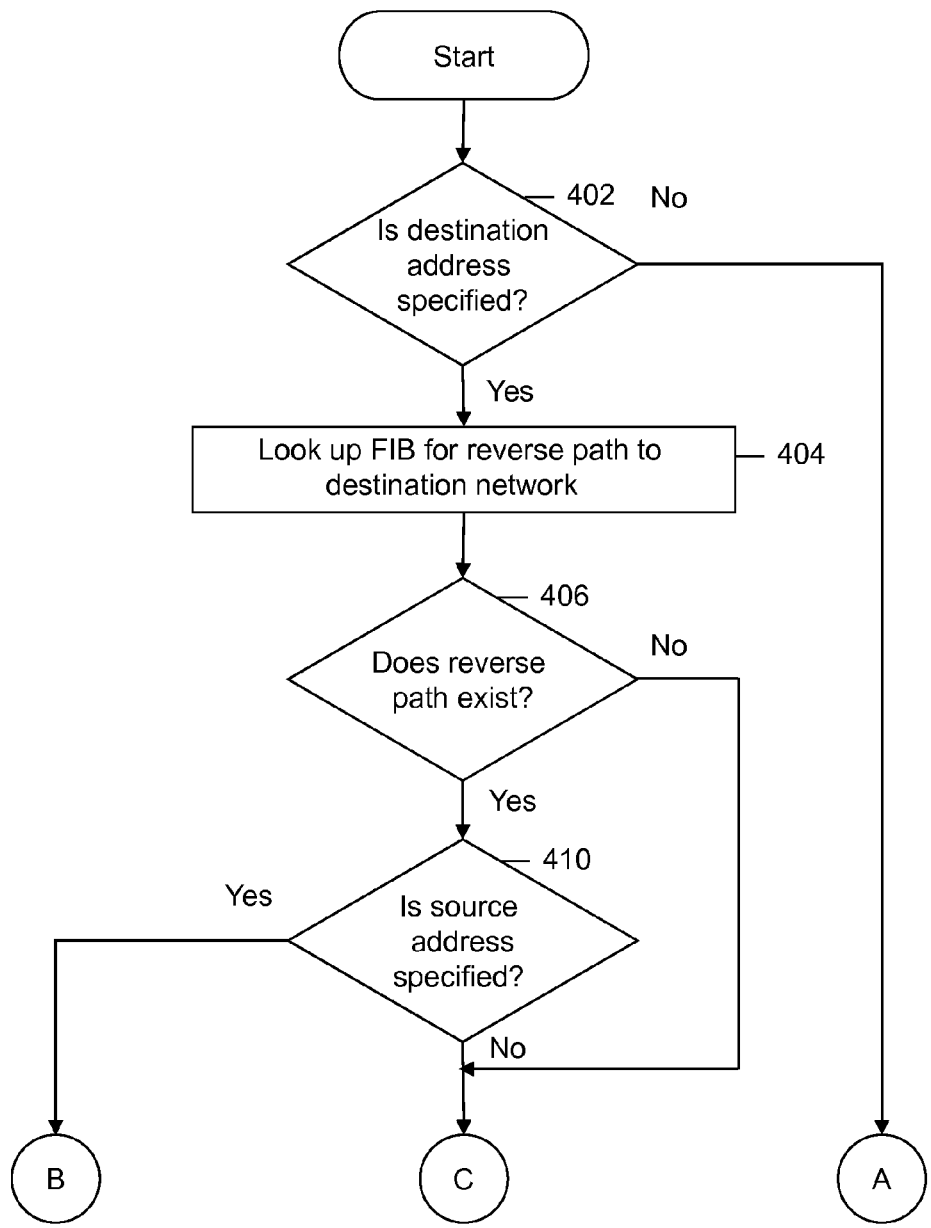
FIGS. 4a and b is a flowchart, illustrating a method to check the validity of the ACE of an egress ACL, in accordance with an embodiment of the present invention.
Figure 4B:
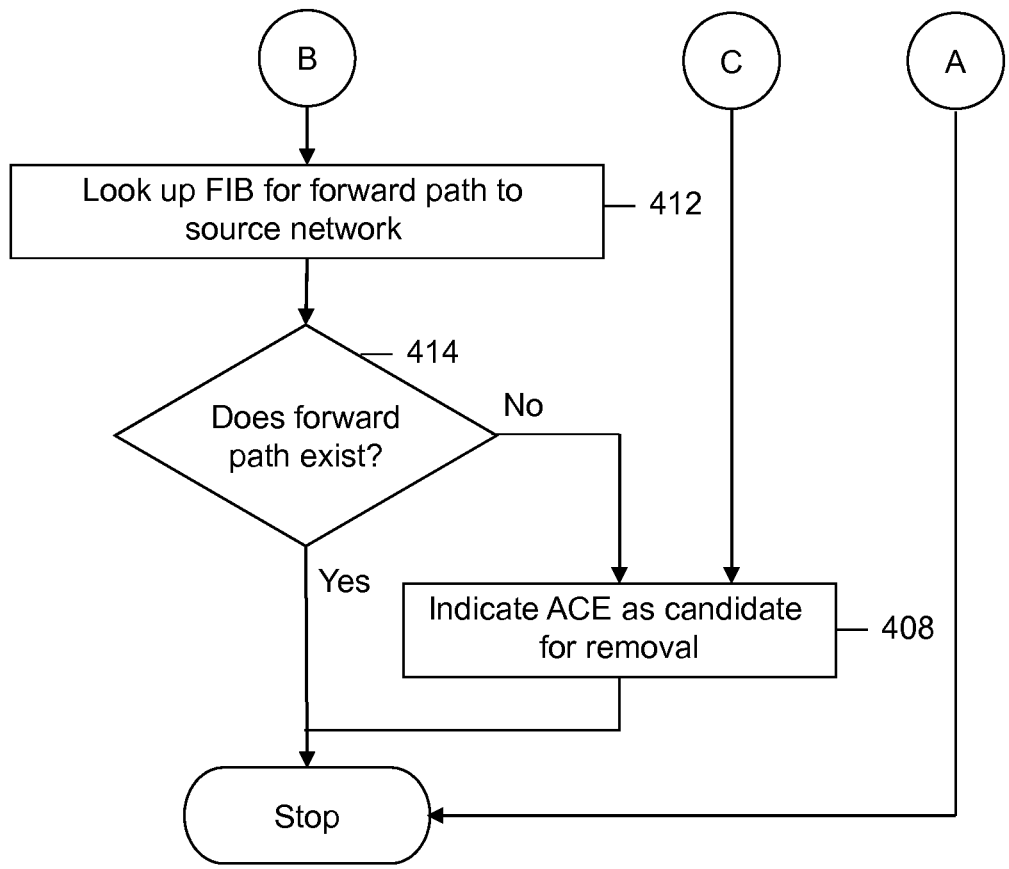

FIGS. 4a and b is a flowchart, illustrating a method to check the validity of an ACE from ACEs 204 of an egress ACL, in accordance with an embodiment of the present invention. At step 402, it is checked if the destination address is specified in the ACE. If the destination address is specified in the ACE, then, at step 404, the FIB is looked up to find a reverse path to a network corresponding to the destination address, hereinafter referred to as a destination network. At step 406, it is checked if the reverse path to the destination network exists. If the reverse path to the destination network does not exist, then, at step 408, the ACE is considered dead and can be indicated as the candidate for removal. If the reverse path to the destination network exists, then, at step 410, it is checked if the source address is specified in the ACE. If the source address is not specified in the ACE, the ACE is considered dead and can be indicated as the candidate for removal, according to step 408. If the source address is specified in the ACE, then, at step 412, the FIB is looked up to find a forward path to a network corresponding to the source address, hereinafter referred to as a source network. At step 414, it is checked if the forward path to the source network exists. If the forward path to the source network does not exist, then, according to step 408, the ACE is considered dead and can be indicated as the candidate for removal.

In accordance with an embodiment of the present invention, only the paths that are mentioned in the FIBs are considered to check the validity of ACEs 204. The default paths to the source and destination networks are not considered while checking the validity of ACEs 204.

In an embodiment of the present invention, the information about the candidates for removal can be used for preventing misconfiguration at routers. For example, if a user tries to configure an ACE from ACEs 204, a router can check the validity of the ACE and warn the user in case the ACE is the candidate for removal.

In an embodiment of the present invention, the network device can be managed using a Network Management System (NMS). The NMS can use the information about dead ACEs to validate the entire ACL 202. In this case, the user can be provided with an option of checking the validity of the entire ACL 202. The NMS checks the validity of the entire ACL 202 by checking all the ACEs. In this way, the user becomes aware of the candidates for removal and can opt to delete the candidates for removal from ACL 202.

In an embodiment of the present invention, if the user opts to check the validity of ACL 202, then the user can configure time periods at which the user would like to receive information about the candidates for removal. A system administrator of the network device warns the user about the candidates for removal at the user-configured time periods.

In an embodiment of the present invention, the system administrator of the network device can warn the network administrator of network 104 about the candidates for removal after a predefined first time limit. Further, the system administrator can automatically delete the candidates for removal after a predefined second time limit. The system administrator of the network device can decide upon the first and the second time limits.

Embodiments of the present invention facilitate checking the validity of ACEs 204 using the FIB and the hit count.

Embodiments of the present invention facilitate checking the validity of the entire ACL 202 in the NMS by checking all the ACEs.

Embodiments of the present invention facilitate preventing misconfiguration at the router by warning the user about the candidates for removal.

Embodiments of the present invention facilitate warning the user about the candidates for removal at the user-configurable time periods.

Embodiments of the present invention facilitate warning the network administrator about the candidates for removal after the pre-defined first time limit.

Embodiments of the present invention facilitate automatically deleting the candidates for removal from ACL 202 after the pre-defined second limit.

According to embodiments of the present invention, a method for an Access Control Entries (ACEs) from an Access Control List (ACL) is provided. The method comprising looking up a Forwarding Information Base (FIB) for a direction dependent path related to an ACE; and if the direction dependent path does not exist, considering the ACE as dead and indicating the ACE as a candidate for removal.

In an embodiment of the invention, a system for removing an Access Control Entry (ACE) from an Access Control List (ACL) is provided. The system comprising a network device, the network device is adapted to look up a Forwarding Information Base (FIB) for a direction dependent path related to an ACE in the ACL; and if the direction dependent path does not exist, then the network device is adapted to indicate the ACE as a candidate for removal.

An embodiment of the present invention provides a machine-readable medium that includes instructions executable by a computer processor. One or more of these instructions look up a Forwarding Information Base (FIB) for a direction dependent path related to an ACE. Other instructions indicate the ACE as a candidate for removal, if the direction dependent path does not exist.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A computer-implemented method comprising:
looking up a forwarding information base for a direction dependent path related to an access control entry in an access control list, the direction dependent path being one of a forward path to a destination network and a reverse path to a source network;
attempting to traverse the direction dependent path;
based on attempting to traverse the direction dependent path, determining that the direction dependent path does not exist;
identifying the access control entry as a candidate for removal from the access control list;
generating, after a first time limit, for presentation to a user, a message that identifies the access control entry as a candidate for removal; and
deleting, after a second time limit, the identified candidate from the access control list,
wherein the first time limit and second time limit are predetermined user set time limits.

2. The computer-implemented method of claim 1, wherein the access control list is an ingress access control list, wherein the access control entry specifies a source address, and wherein looking up the forwarding information base for a direction dependent path related to the access control entry comprises looking up the forwarding information base for a reverse path to a source network.

3. The computer-implemented method of claim 2, wherein identifying the access control entry as a candidate for removal from the access control list comprises determining that the reverse path to the source network does not exist.

4. The computer-implemented method of claim 1, wherein the access control list is an egress access control list, wherein the access control entry specifies a destination address, and wherein looking up the forwarding information base for a direction dependent path related to the access control entry comprises looking up the forwarding information base for a reverse path to a destination network.

5. The computer-implemented method of claim 4, wherein identifying the access control entry as a candidate for removal from the access control list comprises determining that the reverse path to the destination network does not exist.

6. The computer-implemented method of claim 1, further comprising:
determining that the access control entry has a hit count that is lower than a predetermined hit count.

7. The computer-implemented method of claim 1, further comprising:
determining that the access control entry has a hit count that has not changed over a predefined period of time.

8. A system comprising:
a network device configured to:
look up a forwarding information base for a direction dependent path related to an access control entry in an access control list, the direction dependent path being one of a forward path to a destination network and a reverse path to a source network;
attempting to traverse the direction dependent path;
based on attempting to traverse the direction dependent path, determining that the direction dependent path does not exist;
identify the access control entry as a candidate for removal from the access control list;
generate, after a first time limit, for presentation to a user, a message that identifies the access control entry as a candidate for removal; and
delete, after a second time limit, the identified candidate from the access control list,
wherein the first time limit and the second time limit are predetermined user set time limits.

9. The system of claim 8, wherein the access control list is an ingress access control list, wherein the access control entry specifies a source address, and wherein looking up the forwarding information base for a direction dependent path related to the access control entry comprises looking up the forwarding information base for a reverse path to a source network.

10. The system of claim 9, wherein identifying the access control entry as a candidate for removal from the access control list comprises determining that the reverse path to the source network does not exist.

11. The system of claim 8, wherein the access control list is an egress access control list, wherein the access control entry specifies a destination address, and wherein looking up the forwarding information base for a direction dependent path related to the access control entry comprises looking up the forwarding information base for a reverse path to a destination network.

12. The system of claim 11, wherein identifying the access control entry as a candidate for removal from the access control list comprises determining that the reverse path to the destination network does not exist.

13. The system of claim 8, wherein the network device is further configured to:
determine that the access control entry has a hit count that is lower than a predetermined hit count.

14. The system of claim 8, wherein the network device is further configured to:
determine that the access control entry has a hit count that has not changed over a predefined period of time.

15. A non-transitory computer-readable medium encoded with a computer program, the program comprising instructions that when executed by one or more computers cause the one or more computers to perform operations comprising:
looking up a forwarding information base for a direction dependent path related to an access control entry in an access control list, the direction dependent path being one of a forward path to a destination network and a reverse path to a source network;
attempting to traverse the direction dependent path;
based on attempting to traverse the direction dependent path, determining that the direction dependent path does not exist;

identifying the access control entry as a candidate for removal from the access control list;

generating, after a first time limit, for presentation to a user, a message that identifies the access control entry as a candidate for removal; and deleting, after a second time limit, the identified candidate from the access control list, wherein the first time limit and the second time limit are predetermined user set time limits.

16. The computer-readable medium of claim 15, wherein the access control list is an ingress access control list, wherein the access control entry specifies a source address, and wherein looking up the forwarding information base for a direction dependent path related to the access control entry comprises looking up the forwarding information base for a reverse path to a source network.

17. The computer-readable medium of claim 16, wherein identifying the access control entry as a candidate for removal from the access control list comprises determining that the reverse path to the source network does not exist.

18. The computer-readable medium of claim 15, wherein the access control list is an egress access control list, wherein the access control entry specifies a destination address, and wherein looking up the forwarding information base for a direction dependent path related to the access control entry comprises looking up the forwarding information base for a reverse path to a destination network.

19. The computer-readable medium of claim 18, wherein identifying the access control entry as a candidate for removal from the access control list comprises determining that the reverse path to the destination network does not exist.

20. The computer-readable medium of claim 15, further comprising instructions that when executed by the one or more computers cause the one or more computers to perform operations comprising:

determining that the access control entry has a hit count that is lower than a predetermined hit count.

21. The computer-readable medium of claim 15, further comprising instructions that when executed by the one or more computers cause the one or more computers to perform operations comprising:

determining that the access control entry has a hit count that has not changed over a predefined period of time.

\* \* \* \* \*